(12) United States Patent
Ribaric et al.

(10) Patent No.: US 12,709,231 B2
(45) Date of Patent: Aug. 18, 2026

(54) STORAGE UNIT FOR ARRANGEMENT IN A CENTER CONSOLE OF A MOTOR VEHICLE

(71) Applicant: Dr. Ing. h.c. F. Porsche Aktiengesellschaft, Stuttgart (DE)

(72) Inventors: David Ribaric, Cologne (DE); Achim Kling, Neuweiler-Agenbach (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 304 days.

(21) Appl. No.: 18/600,916

(22) Filed: Mar. 11, 2024

(65) Prior Publication Data

US 2024/0317142 A1 Sep. 26, 2024

(30) Foreign Application Priority Data

Mar. 24, 2023 (DE) ..................... 10 2023 107 452.0

(51) Int. Cl.
*B60R 7/04* (2006.01)
*B60N 2/75* (2018.01)
*B60R 11/00* (2006.01)

(52) U.S. Cl.
CPC ................ *B60R 7/04* (2013.01); *B60N 2/793* (2018.02); *B60R 2011/0007* (2013.01)

(58) Field of Classification Search
CPC ... E05B 83/32; B60R 7/04; B60R 2011/0007; B60N 2/793
USPC ...................................................... 296/24.34
See application file for complete search history.

(56) References Cited

U.S. PATENT DOCUMENTS

| | | | | |
|---|---|---|---|---|
| 7,954,871 | B2 * | 6/2011 | Hipshier | B60R 7/04 296/37.8 |
| 7,959,201 | B2 * | 6/2011 | Staib | B60N 2/793 296/37.12 |
| 9,243,434 | B2 * | 1/2016 | Koarai | E05D 11/087 |
| 10,668,861 | B2 * | 6/2020 | Vican | B60R 7/04 |
| 12,485,826 | B2 * | 12/2025 | Son | B60R 7/04 |
| 2019/0032386 | A1 | 1/2019 | Anderson | |
| 2023/0391239 | A1 * | 12/2023 | Hudson | B60K 35/10 |
| 2024/0067096 | A1 * | 2/2024 | Fukui | B60R 7/04 |
| 2025/0289373 | A1 * | 9/2025 | Shimizu | B60N 2/793 |

FOREIGN PATENT DOCUMENTS

| | | | | |
|---|---|---|---|---|
| CN | 107199955 A * | 9/2017 | | E05B 79/12 |
| DE | 102006020264 | 11/2007 | | |
| DE | 102014226599 A1 * | 6/2016 | | B60R 11/0235 |
| KR | 20170112430 A * | 10/2017 | | B60N 2/793 |

* cited by examiner

*Primary Examiner* — Jason S Morrow
(74) *Attorney, Agent, or Firm* — LEYDIG, VOIT & MAYER, LTD.

(57) ABSTRACT

A storage unit (2) for arrangement in a center console of a motor vehicle has a storage housing (4) with a receiving space (6) for receiving an object. A manually displaceable cover (8) is provided for opening and closing the receiving space (6) between first and second end positions. An adjustment system (10) is provided for translational movement of the cover (8) and has first and second racks (16), a shaft (12) and two gear wheels (14) mounted on the shaft (12) for engaging with the first and second racks (16). A braking device (20) is arranged on the shaft (12) for applying an adjustment resistance to the cover (8) during a translational movement of the cover (8).

11 Claims, 4 Drawing Sheets

14
10
44
40
42
38
36
46
20
12
14

STORAGE UNIT FOR ARRANGEMENT IN A CENTER CONSOLE OF A MOTOR VEHICLE

CROSS-REFERENCE TO RELATED APPLICATION

This application claims priority on German Patent Application No 10 2023 107 452.0 filed Mar. 24, 2023, the entire disclosure of which is incorporated herein by reference.

BACKGROUND

Field of the Invention

The invention relates to a storage unit for arrangement in a center console of a motor vehicle, a center console with such a storage unit, and a motor vehicle comprising such a center console.

Related Art

Storage units in a center console of a motor vehicle are known and often comprise a storage housing with a receiving space and a displaceable cover for opening and closing the receiving space. Achieving the proper force for manually opening or closing the cover has been difficult. Accessing the receiving space of the storage unit is inconvenient if the force required to open or close the cover is too great. Conversely, a storage unit cover may open automatically during normal acceleration or deceleration of the vehicle if a required force for opening the cover is too small.

An object of the invention is to provide a center console storage unit with a manually displaceable cover that can be manufactured in a cost-efficient manner while meeting the necessary comfort requirements and providing a defined force for opening or closing the cover.

Details of the invention will arise from the following description, and the drawings. Technical features that are disclosed in connection with the storage unit also apply to the center console and the motor vehicle of the invention, and vice versa.

SUMMARY OF THE INVENTION

The invention relates to a storage unit for arrangement in a center console of a motor vehicle. The storage unit comprises a storage housing with a receiving space for receiving an object, a manually displaceable cover for opening and closing the receiving space between first and second end positions, and an adjustment system for translation of the cover. The adjustment system has first and second racks, a shaft, and two gear wheels mounted on the shaft for engaging the first and second racks. A braking device is arranged on the shaft for applying an adjustment resistance to the cover during translational movement of the cover.

The storage unit is conveniently operable and can be manufactured in a simple and cost-efficient manner due partly to the adjustment system that comprises first and second racks, a shaft, two gear wheels mounted on the shaft and a braking device. The functionality and interaction of these components is explained in greater detail below.

The braking device enables a precisely adjustable force to be applied for displacing the cover of the storage unit in a simple manner.

First and second end positions can be understood to mean front and rear end stops. The shaft can be a synchronous shaft, and the gear wheels can be synchronizing gear wheels to ensure a synchronous operation and prevent twisting or tilting of the cover in the linear guide. The shaft and gear wheels establish the connection between the cover and the racks or the kinematics carrier. The adjustment system can be configured so that the manually displaceable cover can be locked in the front and rear end positions. The gear wheels can be arranged or mounted at the ends of the shaft. The braking device can be used to adjust a manual force to be applied when adjusting the cover. The braking device can be a friction braking device or silicone braking device and can move with the manually displaceable cover.

The cover of some embodiments has multiple parts, including a handle element with a handle for fixing the cover when opening and closing the receiving space. The handle element may be clipped to the cover.

The handle element may have a locking mechanism for locking the cover in end positions and to help prevent the manually displaceable cover from tilting when opening and closing the receiving space. The locking mechanism of some embodiments comprises a handle bar attached to the handle, first and second fixation arms and a deflector. The deflector is rotatable transverse to the displacement direction for connecting the handle bar to the first and second fixation arms. The first and second fixation arms are arranged in a rail system. For example, the rail system can be formed from two rails that may be arranged fixedly on the sides of the storage housing to extend in the longitudinal direction of the vehicle. The individual elements or components of the storage unit can also be connected releasably to each other via clip connections. With regard to decoupled kinematics, straight fixation arms can be provided.

To obtain simple and stable guidance of the cover along a displacement path, the cover can have sliding elements for guiding the cover along the displacement path. The sliding elements can be arranged on the sides on the surface of the cover, and can be configured without compression springs. The sliding elements may be arranged symmetrically along the cover, e.g. fixed on the sides of the cover. The sliding elements also can be guided in the rail system.

The braking device of some embodiments is a friction braking device. A friction brake is suitable for manually displaceable systems that can be closed, since the temperature influence and the influence of speed on the force to be applied to displace the cover is low and the adjustability of the force is simple.

The braking device can have a brake disc and two brake shoes mounted on the shaft for attaching to the brake disc. The brake disc may be mounted on the cover. The surfaces of the brake shoes and the brake disc may be formed from different materials. An inverted bearing with a rotating brake disc and fixed brake shoes could also be implemented. In the context of an advantageous material pairing, one of the surfaces can be made of a thermoplastic, such as polyoxymethylene, and the other can be formed from a metal material, for example steel. Polyoxymethylene is suited particularly well due to its high stiffness, hardness and strength, as well as its high dimensional stability and abrasion resistance. In addition, it is chemically resistant to many solvents and has a good sliding capability. Other suitable material pairings can also be used. Other suitable material pairings can be selected with regard to properties such as low friction, low wear, high media resistance or low noise. It is to be understood that the surfaces of the brake shoes and brake disc can be planar and parallel to each other.

The braking device of some embodiments has a contact pressure unit for generating a contact pressure of the brake shoes on the brake disc and thereby generating the necessary contact pressure of the brake shoes on the brake disc for setting an adjustment resistance during a translational movement of the cover. The contact pressure unit may have a spring element for applying a spring force and a spring pretensioner for pretensioning the spring element. A lock washer can be provided for holding the brake shoes in place and thereby securing the position of the brake shoes when a contact pressure is generated by the contact pressure unit. The brake shoes of some embodiments are arranged between the lock washer and the contact pressure unit. The adjustment resistance during a translational movement of the cover can be adjusted precisely or the force required to displace the cover can be defined precisely via the contact pressure applied by the contact pressure unit, the coefficient of friction between the materials at the surface of the brake shoes and the brake disc (material pairing) and the size of the brake disc. To ensure proper movement of the storage unit, the shaft can have a groove at the position of the brake disc and can take everything except the groove (preferably rotating with the shaft) during a movement. The attached components can be connected positively to the shaft.

The braking device can be arranged substantially centrally on the shaft to ensure a precisely adjustable adjustment resistance of the cover during a translational movement. A substantially central arrangement can also include slight deviations from an absolutely central arrangement of up to 5%.

The first and second racks can be fixed permanently in their position, for example on the storage housing, in particular on laterally opposite sides of the storage housing within the receiving space. Due to the stationary fixing of the racks or the rack tracks for connection to the shaft and the gears, a positioning for controlling a movement is already established, so that an adjustment for a movement is simplified. The racks can be configured in a two-component design (2K design), wherein the material of the base body of the teeth of the rack can be configured from a harder material, such as iron, aluminum, steel or a hard thermoplastic and can be coated with a softer material, such as a thermoplastic elastomer. By using two such materials, the 2K gear rack can provide advantages such as improved sound insulation, higher wear resistance, and better adhesion between the gear rack and gear wheel.

The invention also relates to a center console for a motor vehicle, where the center console has the storage unit described above. The center console of the invention has the same advantages described above with respect to the storage unit.

The invention also relates to a motor vehicle with a storage unit and center console as described above. The motor vehicle of the invention thus has the advantages described with respect to the storage unit or the center console of the invention.

Further advantages, features, and details of the invention arise from the following description, in which embodiments of the invention are described in detail with reference to the drawings. The features mentioned in the claims and in the description can be essential for the invention individually or in any combination.

DETAILED DESCRIPTION

Figure 1:
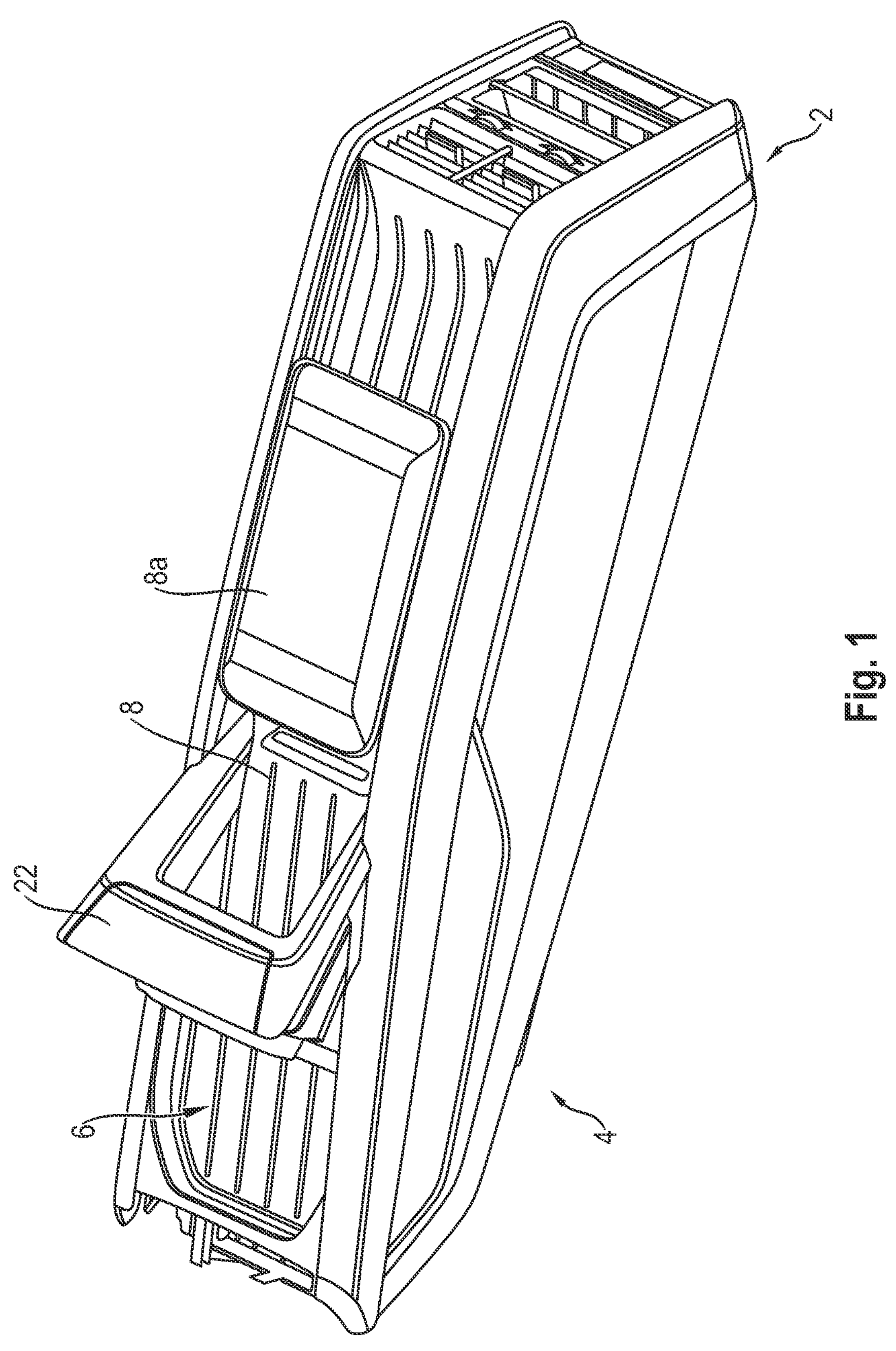
FIG. 1 is a perspective view of a closed storage unit of an embodiment of the invention and configured for arrangement in the center console of a motor vehicle.

FIG. 1 is a perspective view of a closed storage unit 2 according to the invention for arrangement in the center console of a motor vehicle. The storage unit 2 comprises a storage housing 4 and a manually displaceable cover 8 for opening and closing a receiving space 6. A handle element 22 is attached to the cover 8. A cover **8*a* also is arranged on the storage unit 2 in addition to the cover 8**.

Figure 2:
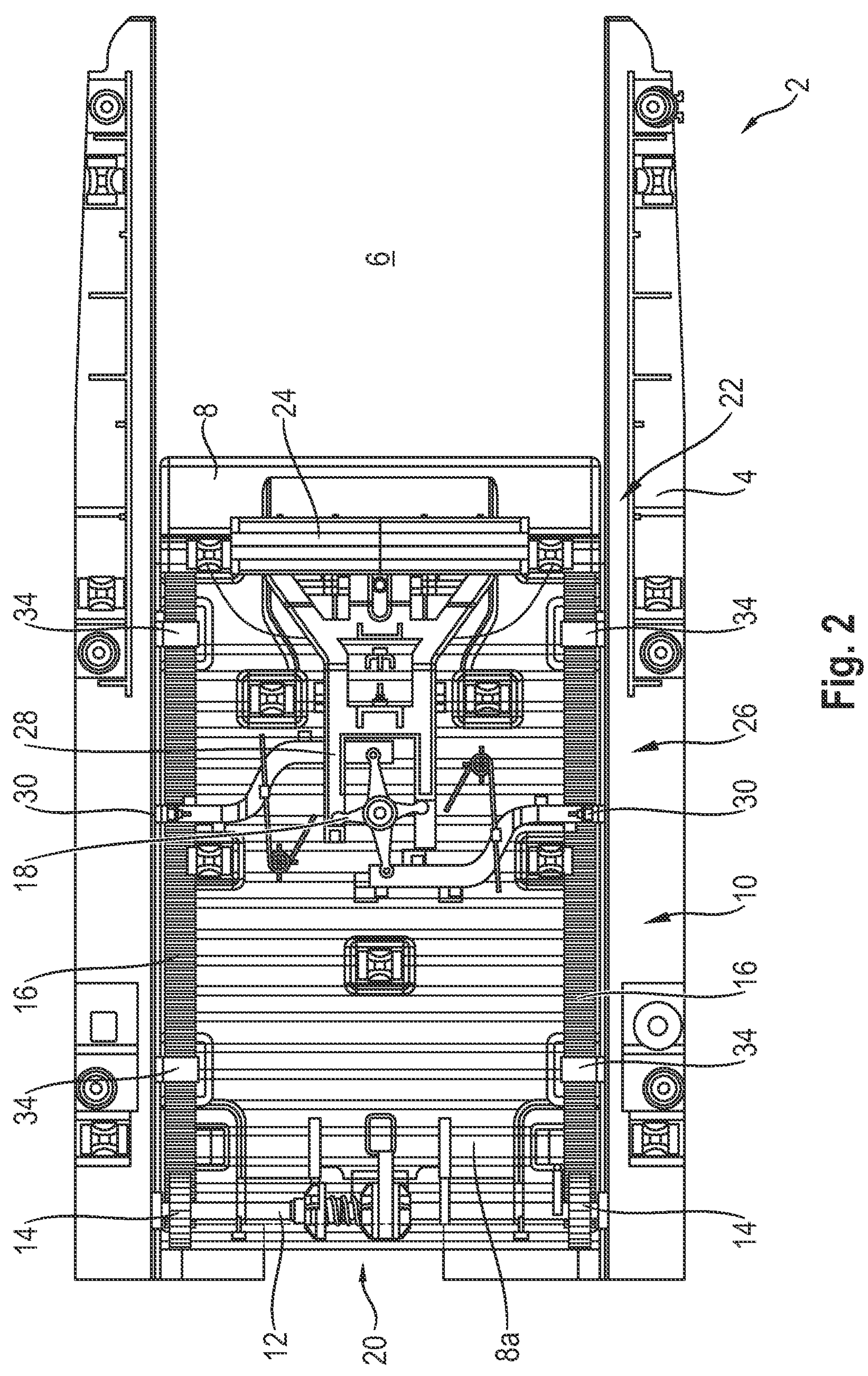
FIG. 2 is a top plan view of the storage unit of FIG. 1 in a fully open state.

FIG. 2 is a plan view of the storage unit 2 of FIG. 1 in a fully opened state. Fig. shows that the storage unit 2 comprises a storage housing 4 with a receiving space 6 for receiving an object. A manually displaceable cover 8 is provided for opening and closing the receiving space 6 between first and second end positions. An adjustment system 10 is provided for translational movement of the cover 8. The adjustment system 10 includes first and second racks 16, a shaft 12 and two gear wheels 14 mounted on the shaft 12 for engaging with the first and second racks 16. A braking device 20 is arranged on the shaft 12 is for applying an adjustment resistance to the cover 8 during a translational movement of the cover 8.

The cover 8 has multiple parts and comprises a handle element 22 with a handle 24 for fixing the cover 8 when the receiving space 6 is opened and closed.

The handle element 22 has a locking mechanism 26 for compensating a movement transverse to the displacement direction. The handle element 22 has a handle bar 28 attached to the handle 24, first and second fixation arms 30 and a deflector 18 rotatable transversely to the displacement direction for connecting the handle bar 28 to the first and second fixation arm 30.

The cover 8 has sliding elements 34 arranged on the sides of the cover 8 for guiding the cover 8 along a displacement path.

Figure 3:
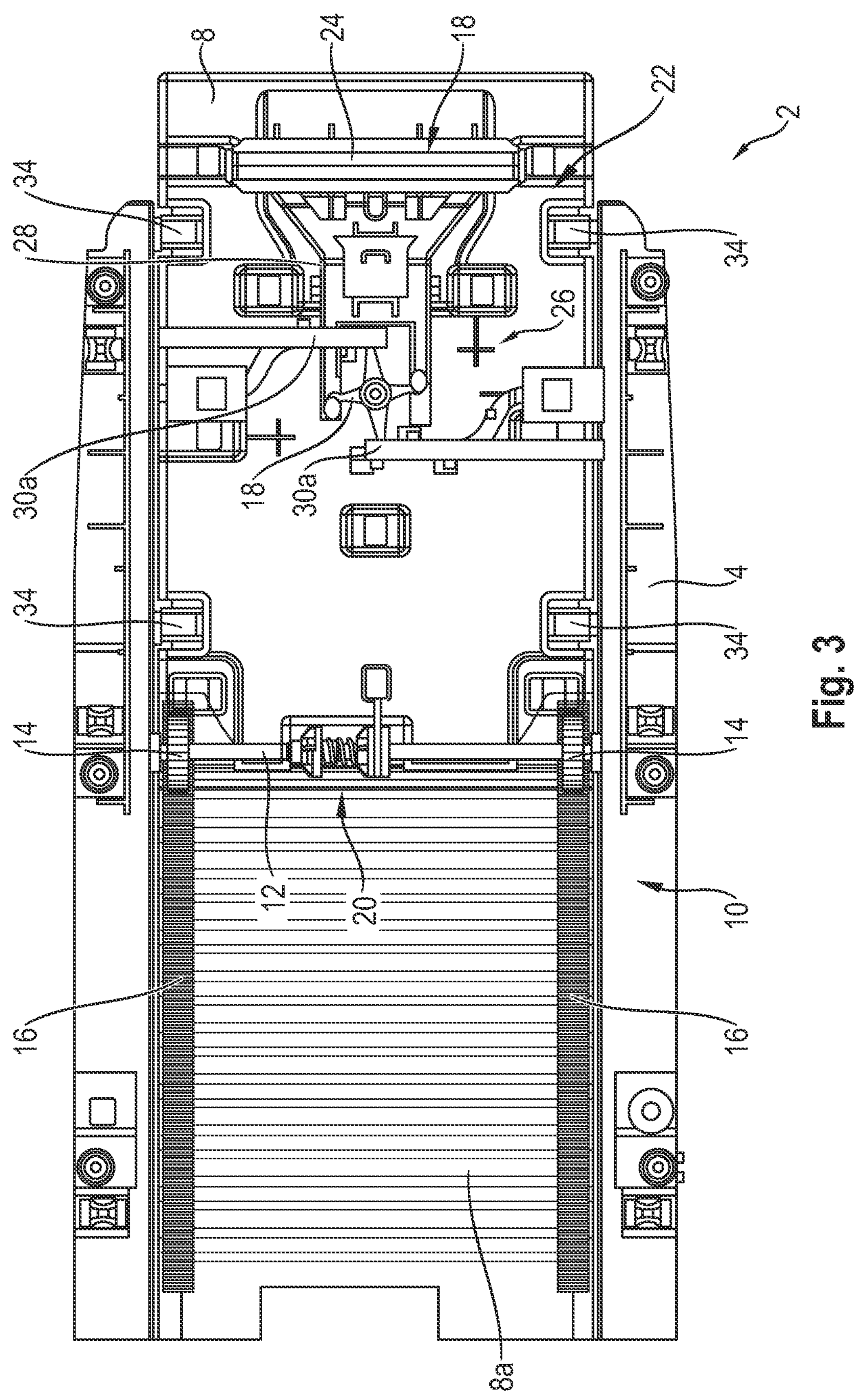
FIG. 3 is a top plan view of an alternate embodiment of the storage unit in a fully closed state

FIG. 3 is a top plan view of a second embodiment of a storage unit 2 for arrangement in the center console of a motor vehicle where the storage unit 2 is in a fully closed state. In contrast to the first embodiment, the second embodiment has straight fixation arms **30*a* for attachment to the rotatable deflector 18**.

Figure 4:
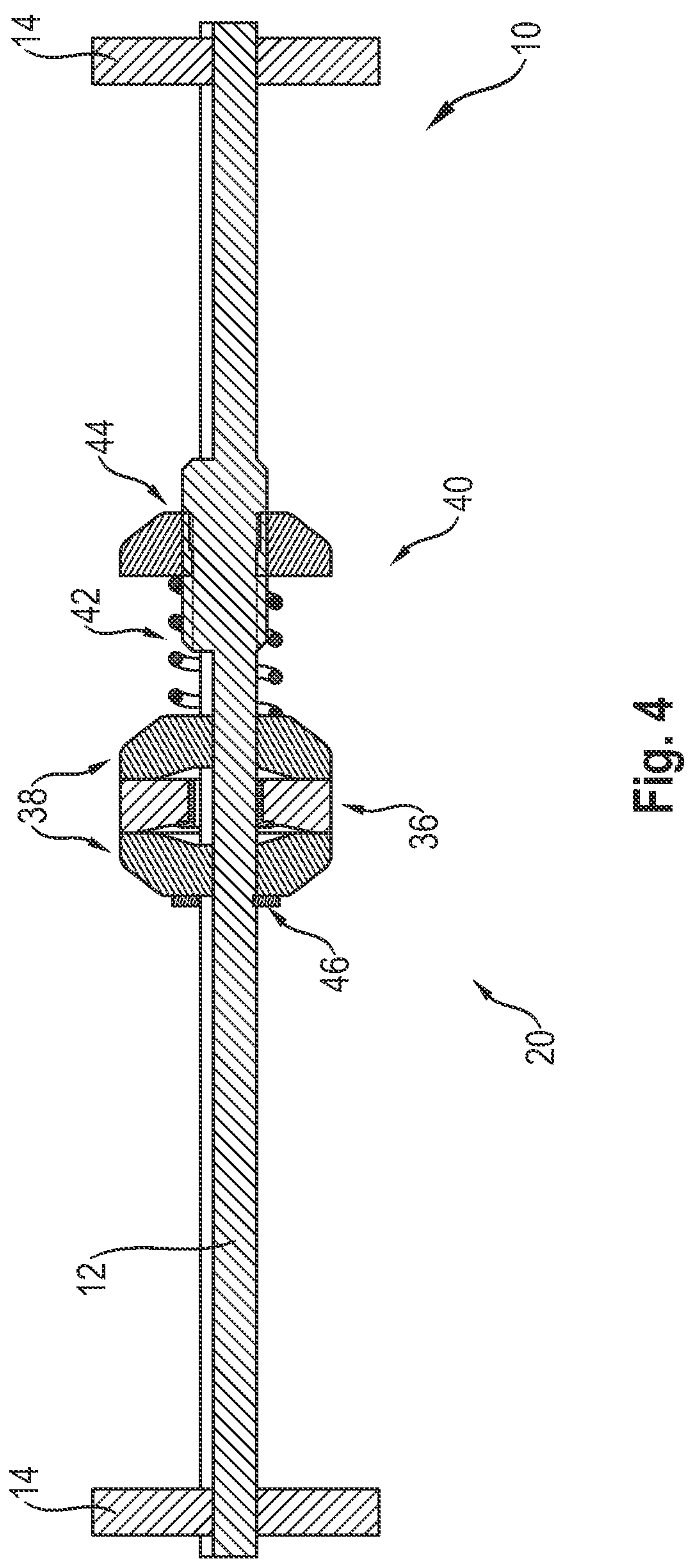
FIG. 4 is a front view of a portion of an adjustment system according to the invention for translational movement of a cover of the storage unit.

FIG. 4 is a front view of a portion of an adjustment system 10 according to the invention for translational movement of a cover 8 of the storage unit 2. The braking device 20 of FIG. 4 has a brake disc 36 and two brake shoes 38 mounted on the shaft 12 for attaching to the brake disc 36. The braking device 20 also has a contact pressure unit 40 to generate a contact pressure of the brake shoes 38 on the brake disc 36. The contact pressure unit 40 has a spring element 42 for applying a spring force, a spring pretensioner 44 for pretensioning the spring element 42, and a lock washer 46.

The above explanation of the embodiments describes the present invention solely in the context of examples. Of course, individual features of the embodiments can be freely combined with one another, if technically meaningful, without leaving the scope of the present invention.

The invention claimed is:

1. A storage unit for arrangement in a center console of a motor vehicle, comprising:

a storage housing having a receiving space for receiving an object;

a manually displaceable cover for opening and closing the receiving space between a first and second end position; and an adjustment system for translational movement of the cover, the adjustment system comprising first and second racks, a shaft and two gear wheels, the shaft engaging with the first and second racks via the two gear wheels, a braking device arranged on the shaft for applying an adjustment resistance to the cover during a translational movement of the cover.

2. The storage unit of claim 1, wherein the cover is configured in multiple parts, and comprises a handle element with a handle for fixing the cover when opening and closing the receiving space.

3. The storage unit of claim 2, wherein the handle element comprises a locking mechanism for locking the cover in end positions, the locking mechanism comprising a handle bar fixed to the handle, first and second fixation arms and a deflector rotatable transversely to the displacement direction for connecting the handle bar to the first and second fixation arms, wherein the first and second fixation arms are arranged in a rail system.

4. The storage unit of claim 1, wherein the cover comprises sliding elements for guiding the cover along a displacement path, the sliding elements being arranged on sides of the cover and having no compression springs.

5. The storage unit of claim 1, wherein the braking device is a friction braking device.

6. The support storage unit of claim 5, wherein the braking device comprises a brake disc and two brake shoes mounted on the shaft for attaching to the brake disc, the brake being mounted on the cover, and surfaces of the brake shoes and the brake disc being formed from different materials.

7. The storage unit of claim 6, wherein the braking device comprises a contact pressure unit for generating a contact pressure of the brake shoes on the brake disc, the contact pressure unit comprising a spring element for applying a spring force and a spring pretensioner to pretension the spring element.

8. The storage unit of claim 1, wherein the braking device is arranged substantially centrally on the shaft.

9. The storage unit of claim 1, wherein the first and the second racks are permanently fixed on laterally opposite sides of the storage housing within the receiving space.

10. A center console for arrangement in a motor vehicle, the center console comprising a storage unit, the storage unit comprising:

a storage housing having a receiving space for receiving an object;

a manually displaceable cover for opening and closing the receiving space between a first and second end position;

an adjustment system for translational movement of the cover, the adjustment system comprising first and second racks, a shaft and two gear wheels, the shaft engaging with the first and second racks via the two gear wheels, a braking device arranged on the shaft for applying an adjustment resistance to the cover during a translational movement of the cover.

11. A motor vehicle comprising a center console, the center console comprising a storage unit, the storage unit comprising:

a storage housing having a receiving space for receiving an object;

a manually displaceable cover for opening and closing the receiving space between a first and second end position; and an adjustment system for translational movement of the cover, the adjustment system comprising first and second racks, a shaft and two gear wheels, the shaft engaging with the first and second racks via the two gear wheels, a braking device arranged on the shaft for applying an adjustment resistance to the cover during a translational movement of the cover.

* * * * *